United States Patent [19]

Sabin

[11] Patent Number: 4,819,480

[45] Date of Patent: Apr. 11, 1989

[54] MEANS AND TECHNIQUES USEFUL IN DETECTING ICE ON AIRCRAFT SURFACES

[75] Inventor: Cullen M. Sabin, San Diego, Calif.

[73] Assignee: Geoscience, Ltd., Solana Beach, Calif.

[21] Appl. No.: 148,030

[22] Filed: Jan. 25, 1988

[51] Int. Cl.[4] .................. B64D 15/20; G01W 1/00
[52] U.S. Cl. .................. 73/170 R; 244/134 F; 340/581
[58] Field of Search .................. 244/134 F, 134 D; 374/7, 45, 174, 29, 30; 340/581, 962; 73/170 R

[56] References Cited

U.S. PATENT DOCUMENTS 3,276,254 10/1966 Richard .................. 340/581
3,305,851 2/1967 Brandtszteter .................. 340/581
3,525,648 8/1970 Poppendiek .................. 136/226
4,333,004 6/1982 Forgve et al. .................. 340/580

Primary Examiner—Charles A. Ruehl
Assistant Examiner—Hollis Chen
Attorney, Agent, or Firm—Frank E. Mauritz

[57] ABSTRACT

Ice formation on an aircraft surface swept of an air flow is detected by using an electrical heater which produces a small limited amount of heat to, on the one hand a heat flow meter and, on the other hand to a heat sink. When there is no ice on the transducer it produces a large output signal but when ice forms on the transducer the ice, due to its high resistance to heat flow, causes a change in balance between the two heat flows and a change in output of the heat flow measuring transducer.

10 Claims, 1 Drawing Sheet

MEANS AND TECHNIQUES USEFUL IN DETECTING ICE ON AIRCRAFT SURFACES

The present invention relates to means and techniques useful in the detection of ice on aircraft surfaces.

The dangers of ice build-up on aircraft surfaces are well known and many different means have been suggested in the past for detecting the presence of such ice. Fractured ice from an ice build-up on engine compressor inlets can seriously damage the engine, but existing ice detectors lack the reliability required to provide positive icing indications.

The present invention makes use of the fact that ice when formed on a surface swept by an air stream has a high impedance to heat transfer. Such high impedance of the ice when formed is detected by locating a heat flux transducer flush with the aircraft surface which is expected to become iced and in relation to an electrical heater that is located between such transducer and a heat sink. The heat flow from the heater to the transducer on the one hand and the heater to the heat sink on the other are continuously monitored and an indication is produced when there is an imbalance caused by ice formation on the transducer.

It is therefore an object of the present invention to provide improved means for ice detection on aircraft surfaces, on aircraft engine air inlet surfaces and/or aircraft lifting surfaces using a novel combination of a heat flux transducer, heater and heat sink, functioning in a novel manner and producing new and improved results.

Features of the present invention which are believed to be novel are set forth in the appended claims. The invention itself, both as to its organization and manner of operation together with further objects and advantages thereof, may be best understood by reference to the following description taken in connection with the accompanying drawings in which:

Figure 1:
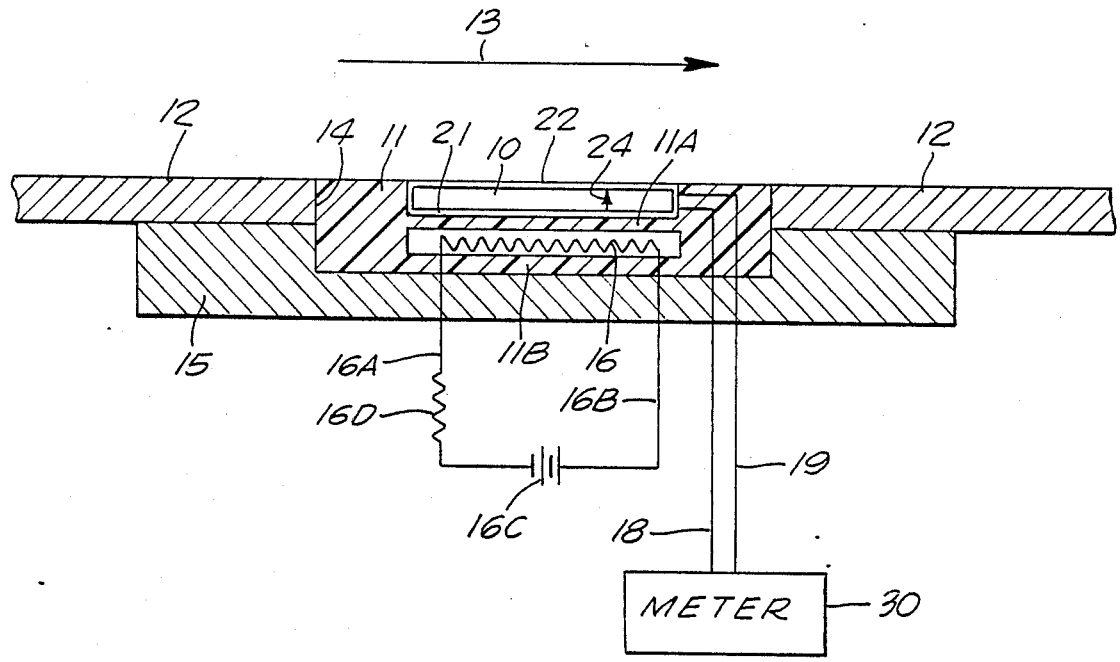
FIG. 1 is a sectional view of elements positioned relative to an aircraft engine inlet surface and also illustrates their electrical interconnections.

In FIG. 1 a heat flux transducer 10, generally rectangular in shape, has one of its surfaces mounted in thermal insulation 11 flush with the external surface of the aircraft air inlet metal skin 12 which is swept by an air stream as indicated by the air flow arrow 13.

As shown, the transducer is located in a cavity 14 which is filled with the insulation 11, the cavity 14 being defined in part by an apertured portion of the skin material 12 and a dished heavy metal heat sink 15. An electrical heater 16 is located in the cavity 14 with the insulation between it and transducer 10 and heat sink 15.

The transducer 10 has an electrical output applied via leads 18, 19 to meter 30. Such output is a measure or indication of the quantity of heat, i.e. heat flux, flowing through transducer 10. Transducer 10 is not to be confused with a simple temperature measuring device because its output is the result of differential voltages developed in transducer 10.

Figure 2:
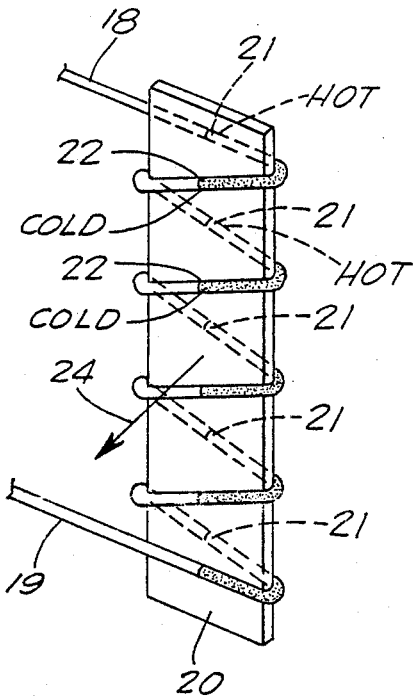
FIG. 2 is a perspective view that illustrates constructional features of the heat flux transducer in FIG. 1.

The transducer 10 is a commercially available device and may be constructed as shown in U.S. Pat. No. 3,525,648 issued on Aug. 25, 1970 to Heinz F. Poppendiek. It involves, as exemplified in FIG. 2, an insulating card 20 on which a series of hot junctions 21 are located on one of its faces and a series of cold junctions 22 are located on its other face. The card 20 of heat insulating material is positioned in FIG. 1, such that the flow of heat therethrough is in the direction indicated by arrow 24, 1.e from the series of hot junctions 21 to the series of cold junctions 22 and in so doing develops an electrical output on leads 18, 19, such output being the additive result of voltages developed between the many junction pairs 21, 22. The relative positions of these junctions 21, 22 with respect to heat flow is also indicated in FIG. 1.

The heater 16 is connected via leads 16A, 16B and a current limiting resistance 16D to an electrical energy source 16C to produce an upward heat flow from the heater 16 through insulation portion 11A to transducer 10 and also a downward heat flow from heater 16 through insulation portion 11B to the heat sink 15 which is sufficiently massive to absorb all of heat flowing to it without producing any substantial rise in its temperature. The heater 16 produces a limited amount of heat for assuring a change in balance between two heat flows as explained later. The resistance to heat flow through insulation portions 11A and 11B is preferably such that it is comparable in value to the resistance of heat flow through the ice layer that is expected to be developed on that surface of transducer 10 which is flush with the skin material 12.

In operation there is a limited amount of heat developed by the heater 16 and it is divided with some of the heat flowing to and through the transducer 10 and substantially the rest of the heat developed flows into the heat sink 15. When there is no ice on transducer 12 there is a relatively large heat flow through the transducer 10 and this is so indicated on output meter 30 as a larger signal. On the other hand, when ice is present on transducer 10 the thermal impedance of the ice causes a smaller amount of the total available heat from heater 16 to pass through transducer 10 and consequently this condition is indicated on output meter 30 as a relatively small signal. Thus an ice layer changes the balance between the two heat flows and causes a change in transducer output.

This difference in the two outputs may be used to control/operate conventional de-icing equipment to remove that ice which caused the smaller output signal.

While a particular embodiment of the present invention has been shown and described it will be obvious to those skilled in the art that changes and modifications may be made without departing from the invention in its broader aspects and therefore the aim in the appended claims is to cover all such changes as fall within the true spirit and scope of the invention.

That which is claimed as the invention is:

1. The method of detecting the presence of ice on a surface, mounting a heat flow transducer flush with such surface, mounting a heater below said surface to produce a first heat flow therefrom in a first path that extends from said heater to and through said transducer, mounting a heat sink to produce a second heat flow from said heater in a second path, opposite from said first path, to said heat sink, limiting the amount of total heat produced by said heater so that the presence of ice on said transducer, due to the high impedance of the ice, causes a change in balance between said first and said second heat flows and a lessening of the output of said transducer.

2. The method as set forth in claim 1 including the steps of interposing insulation in said first path and also in said second path , said insulation in each path having a thermal resistance comparable to the thermal resistance of ice which is expected to be developed on said transducer.

3. In an ice detection system, the combination including, a heat flux transducer for indicating the flow of heat therethrough, a heat sink, heat producing means mounted between said transducer and said heat sink to produce two heat flows in opposite directions extending, on the one hand, in a first path from said heat producing means to a first side of said transducer and, on the other hand, in a second path extending from said heat producing means to said heat sink, and means mounting said transducer such that a second side opposite to said first side is exposed to ice formation conditions.

4. The combination as set forth in claim 3 in which said mounting means mounts said transducer flush with an air swept surface of an aircraft.

5. The combination as set forth in claim 3 in which first insulation means is interposed in said first path, and second insulation means is interposed in said second path, and the thermal resistance of said first and said second insulation means each having a thermal resistance comparable to the thermal resistance of that ice expected to be developed on the transducer.

6. The combination set forth in claim 3 in which said transducer and said heat producing means are disposed within cavity means, said cavity means being defined in part by an apertured portion of an aircraft skin surface and in part by said heat sink.

7. The combination as set forth in claim 6 in which heat insulation material fills the remaider of said cavity means with some of said insulation means being in said first path and some of said insulation means being in said second path.

8. the combination as set forth in claim 7 in which said heat sink is dish shaped.

9. The combination as set forth in claim 3 in which the total heat produced by said heat producing means is limited by limiting means included in said heat producing means, such that there is a change in the heat flowing in said first and second paths and in a change in the output of said transducer after ice forms on said transducer.

10. The combination as set forth in claim 3 including indicating means connected to said transducer for indicating its output.

* * * * *